US012064381B1

(12) United States Patent
Tennent, III

(10) Patent No.: US 12,064,381 B1
(45) Date of Patent: Aug. 20, 2024

(54) WHEELCHAIR BRAKING DEVICE

(71) Applicant: David Daniel Tennent, III, Canonsburg, PA (US)

(72) Inventor: David Daniel Tennent, III, Canonsburg, PA (US)

(73) Assignee: David Daniel Tennent, III, Canonsburg, PA (US)

( * ) Notice: Subject to any disclaimer, the term of this patent is extended or adjusted under 35 U.S.C. 154(b) by 0 days.

(21) Appl. No.: 18/101,795

(22) Filed: Jan. 26, 2023

(51) Int. Cl.
*A61G 5/10* (2006.01)

(52) U.S. Cl.
CPC ......... *A61G 5/1013* (2013.01); *A61G 5/1035* (2013.01)

(58) Field of Classification Search
CPC .. A61G 5/1013; A61G 5/1005; A61G 5/1035; A61G 5/1037
See application file for complete search history.

(56) References Cited

U.S. PATENT DOCUMENTS 4,268,054 A * 5/1981 Twitchell ............. A61G 5/1035 188/2 F
9,050,226 B2 * 6/2015 Husted ................... A61G 5/085
2004/0051272 A1 * 3/2004 Wong ................... A61G 5/1086 280/244

FOREIGN PATENT DOCUMENTS

GB 818212 A * 2/1957

OTHER PUBLICATIONS

Korean Patent No. KR 100198859 to Noh published on Jun. 15, 1999.*
Korean Patent No. KR 20200011676 to Kim et al published on Feb. 4, 2020.*

* cited by examiner

*Primary Examiner* — Pamela Rodriguez
(74) *Attorney, Agent, or Firm* — Ference & Associates LLC

(57) ABSTRACT

An embodiment provides a wheelchair braking device, the wheelchair braking device including: at least two brake mechanisms, wherein, when the wheelchair braking device is engaged in a brake position on a wheelchair, at least one brake mechanism engages with a first of a plurality of wheels on the wheelchair and at least a second brake mechanism engages with a second of the plurality of wheels on the wheelchair; a connection component extending between the at least two brake mechanisms; and a brake handle connected to the connection component and causing movement of the at least two brake mechanisms simultaneously with respect to the plurality of wheels. Other aspects are described and claimed.

20 Claims, 5 Drawing Sheets

WHEELCHAIR BRAKING DEVICE

BACKGROUND

Many people utilize wheelchairs either temporarily or for extended periods of time. For example, some people may be leaving a healthcare facility and may be transported out of the facility utilizing a wheelchair. As another example, some people may have disabilities or health conditions that mean that a wheelchair is a primary or common form of transportation. Wheelchairs provide an easy form of transportation that allows another person to push the person in the wheelchair or allows the person in the wheelchair to turn the wheels, allowing the person to move themselves. Since the wheelchair utilizes wheels, the amount of effort needed to move the person, either by another person or by themselves, is much less than other forms of transportation.

Additionally, the seated position of the wheelchair keeps a person safe from falls caused by weakness, vertigo, dizziness, confusion, and/or the like. Additionally, many wheelchairs have the capability to be collapsed which allows for the wheelchair to be folded into a compact form that allows for easy transportation of the wheelchair so that it can be used in another location. Thus, wheelchairs are a relatively safe, efficient, and effective form of transportation for many people who need the wheelchair.

BRIEF SUMMARY

One embodiment provides a wheelchair braking device, the wheelchair braking device including: at least two brake mechanisms, wherein, when the wheelchair braking device is engaged in a brake position on a wheelchair, at least one brake mechanism engages with a first of a plurality of wheels on the wheelchair and at least a second brake mechanism engages with a second of the plurality of wheels on the wheelchair; a connection component extending between the at least two brake mechanisms; and a brake handle connected to the connection component and causing movement of the at least two brake mechanisms simultaneously with respect to the plurality of wheels.

Another embodiment provides a wheelchair braking system, the braking system including: a wheelchair including a plurality of wheels; and a wheelchair braking device coupled to the wheelchair, the wheelchair braking device including: at least two brake mechanisms, wherein, when the wheelchair braking device is engaged in a brake position on the wheelchair, at least one brake mechanism engages with a first of the plurality of wheels on the wheelchair and at least a second brake mechanism engages with a second of the plurality of wheels on the wheelchair; a connection component extending between the at least two brake mechanisms; and a brake handle connected to the connection component and causing movement of the at least two brake mechanisms simultaneously with respect to the plurality of wheels.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
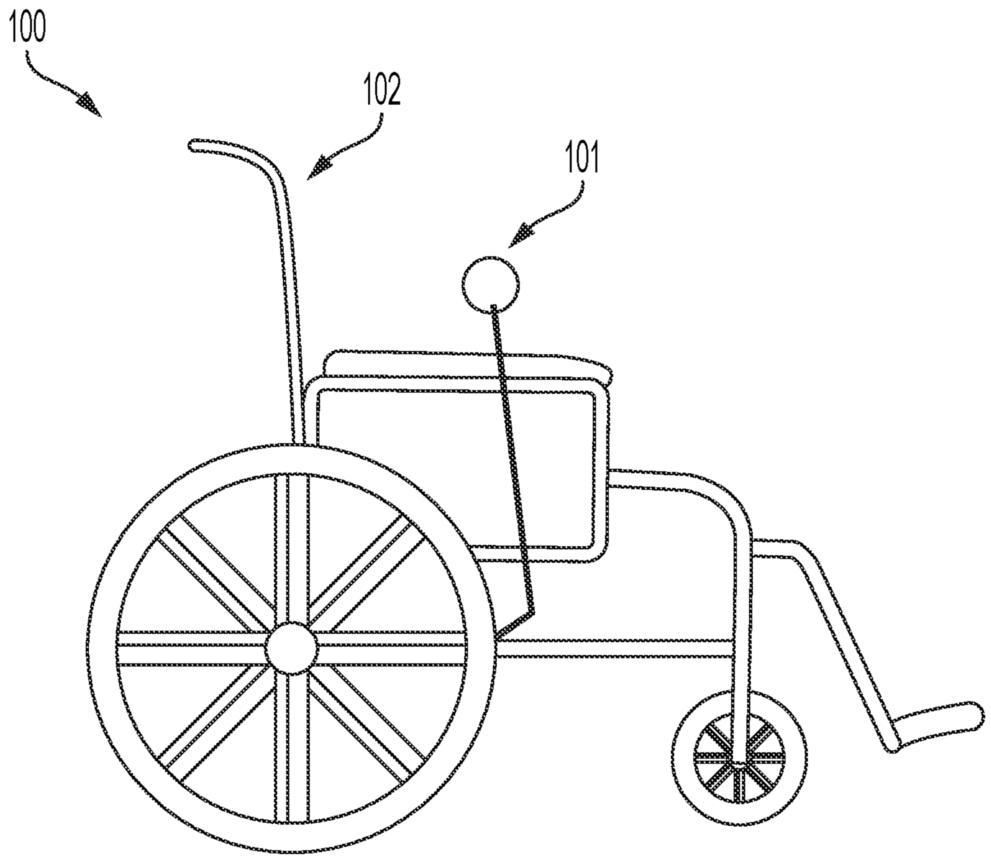
FIG. 1 illustrates an illustrative example of a wheelchair with the wheelchair braking device.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While wheelchairs are relatively safe for transporting a person, the most unsafe condition or time of use of the wheelchair is getting the person in and out of the wheelchair. In other words, as the person is trying to get up from the wheelchair is attempting to sit in the wheelchair is the time that a person is most likely to suffer from injury due to the wheelchair. The fact that the wheelchair is on wheels means that the chair easily moves. Thus, if the person is pushing up from the chair it is easy for the wheelchair to move causing the person to lose their balance. In the best case in this scenario, the person will fall back into the chair. However, in the worst case in this scenario, the person may fall on the floor and get injured.

Similarly, if a person is attempting to sit in the chair, it is common for the person to grab the chair to assist in steadying the person. Grabbing the chair and putting pressure on it, may cause the chair to move. Since the person is in a partially seated position and is using the wheelchair for stabilization, this wheelchair movement is likely to cause the person to fall. Again, in a best-case scenario, the person may fall into the wheelchair. However, this is less likely with this scenario than when the person is attempting to rise from the chair. In a worst-case scenario, the person may fall onto the floor and get injured.

To assist in preventing these injuries, the wheelchair is equipped with a braking system that locks the large back wheels, thereby preventing the wheelchair from moving. This means that the wheelchair, when in the braked condition or state, is stationary more like a traditional chair. Additionally, due to the fact that most wheelchair wheels are made from rubber or similar material, the wheelchair may be even more stable than a traditional chair due to the friction caused between the wheel material and the floor. However, traditional wheelchair braking systems rely on two separate brakes that are engaged, one brake for each of the large back wheels. If one brake is not engaged or is not engage properly, the wheelchair will spin in the direction of the non-engaged brake. Thus, the wheelchair can still move and will still move upon application of pressure, for example, by a person attempting to sit in or rise from the chair. Many scenarios are possible that result in the engagement of a single brake or that make it difficult for a person to engage both brakes, including the location of the braking mechanisms, health conditions of the individual which may difficult to reach or access one of the braking mechanisms, health conditions of the individual which may make it difficult to remember to engage all the wheelchair brakes, improper operation of the braking mechanisms, and/or the like.

Additionally, these brakes are generally engaged utilizing a lever that then engages a brake pad or brake mechanism against the wheel. Engage the brakes may require a significant amount of force because the engagement of the brakes usually requires the brake mechanism to dig into the wheel of the wheelchair or press very firmly against the wheel. However, since engaging the brakes may require a significant amount of force this brake engagement may be difficult for some people based upon health conditions of the individual that cause the individual to be unable to provide the required amount of force. Thus, traditional wheelchair braking systems may be difficult to operate for those who are most likely to need the wheelchair, for example, dementia patients, individuals suffering from weakness, individuals who have recently undergone a health procedure, individuals who have been given medication which may affect cognitive and/or physical abilities, and/or the like.

Accordingly, the described device and system provides a wheelchair braking device that engages the braking mechanism for both wheels simultaneously using a single braking handle. Additionally, the force required to apply the brakes is less than found in current wheelchair braking systems. The wheelchair braking device includes at least two brake mechanisms, where one of the brake mechanisms is located with respect to one wheel of the wheelchair to apply braking to that one wheel and where another of the brake mechanisms is located with respect to another wheel of the wheelchair to apply braking to that another wheel when the braking device is engaged. In other words, for simplicity, the braking device may have two braking mechanisms, where one braking mechanism applies braking force to one wheel of the wheelchair and the other braking mechanism applies braking force to the other wheel of the wheelchair when the braking device is engaged.

The brake mechanisms are connected together utilizing a connection component. The connection component is in a configuration that allows the connection component to attach to the wheelchair to hold the braking device and that allows both braking mechanisms to be applied to each corresponding wheel simultaneously. Generally, this means that the connection component will not be a linear shape and will instead have bends or be made of more than one piece of material so as to allow a non-linear configuration. The braking device also include a brake handle that, when moved, causes the brake mechanisms to move simultaneously with respect to the wheels. For example, when the brake handle is moved towards a brake engaged position, it will cause the brake mechanisms to move towards the wheels until engaged in the braked position. When the brake handle is moved towards a brake disengaged position, it will cause the brake mechanisms to move away from the wheels until a fully disengaged position is reached.

The illustrated example embodiments will be best understood by reference to the figures. The following description is intended only by way of example, and simply illustrates certain example embodiments.

It should be noted that the term "engaged" will refer to the state of the braking device when the brakes have been applied to the wheels. Thus, the braking device is engaged to hold the wheelchair wheels from spinning. The term "disengaged" will refer to the state of the braking device when the brakes are released from or not applied to the wheels. Thus, the braking device is disengaged allowing the wheelchair wheels to spin.

For ease of readability, the braking device will be described as having two braking mechanisms. However, the braking device could have more than two braking mechanisms, for example, the device could apply more than one braking mechanism to each wheel. As another example, the wheelchair may have more than two wheels to which braking mechanisms may be applied. Additionally, it should be noted that, like traditional wheelchairs, the braking mechanism will be described as being applied to the rear wheels of the wheelchair, which are generally larger wheels located near the armrests or arms of a user located within the wheelchair. However, this is not strictly necessary as there may be applications where having braking mechanisms on other wheels of the wheelchair device may be desirable.

Figure 2:
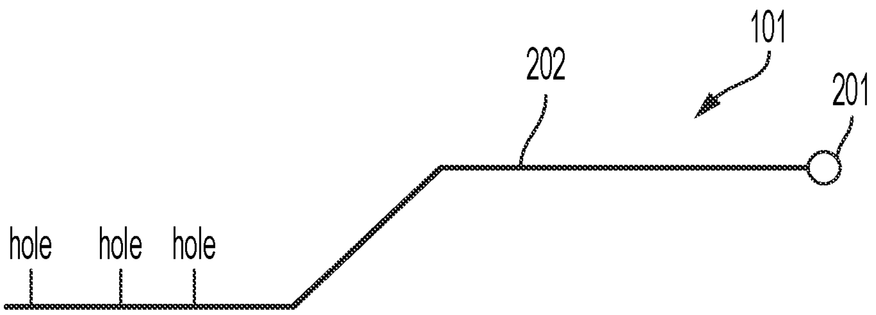
FIG. 2 illustrates an illustrative example of the wheelchair braking device handle.
Figure 4:
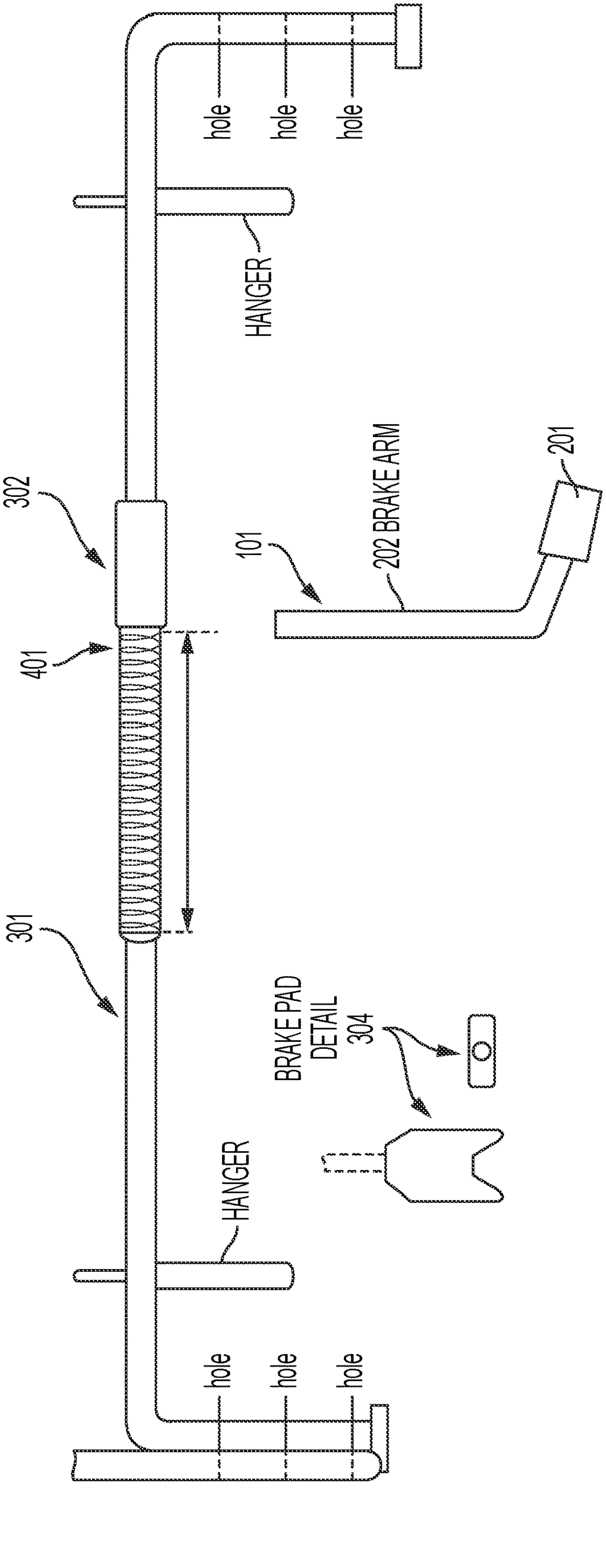
FIG. 4 illustrates an illustrative example of the wheelchair braking device with collapsing capabilities.

FIG. 1 illustrates an example of a wheelchair braking device system 100. The wheelchair braking device system 100 includes the braking device having a brake handle 101 and a wheelchair 102 on which the braking device is installed. Installation of the braking device on a wheelchair may include removing the conventional braking devices and installing the described braking device utilizing attachment mechanisms which are described further herein. FIG. 2 illustrates an example of the wheelchair braking device handle 101. The handle may include a knob, handle, or other holding object 201 and a bar, rod, or other piece 202 that extends between the knob 201 and the braking device connection component 301. Thus, the knob 201 may be located at a distal end of the brake handle 101 with respect to the connection component 301. A detail view of the brake handle 101 is illustrated in FIG. 4.

As shown in FIG. 2, the bar 202 may not be straight and may have bends or curves. This allows for the handle 101 to be located at a location that is easily accessible by a person in the wheelchair, for example, as shown in FIG. 1, near the armrest of the wheelchair where a person's arm or hand may be located. Additionally, a person who is pushing the wheelchair can also easily access the handle 101. Thus, the number of bends, curves, and/or the like, and the location thereof in the bar 202 may vary and be based upon a desired location of the handle 101 with respect to the wheelchair 102. Additionally, it should be noted that the bar 202 may be straight. The handle 101 may be made of any suitable material, for example, carbon fiber, steel, aluminum, plastic, and/or the like. Depending on the material, the bar 202 and/or knob 201 may be customizable or have decorative features. For example, the bar 202 and/or knob 201 may have twists, may be bent or molded to have specialized designs, may have engravings, may have embossings, may be etched, may have adornments, and/or any other number of decorative features.

Figure 3:
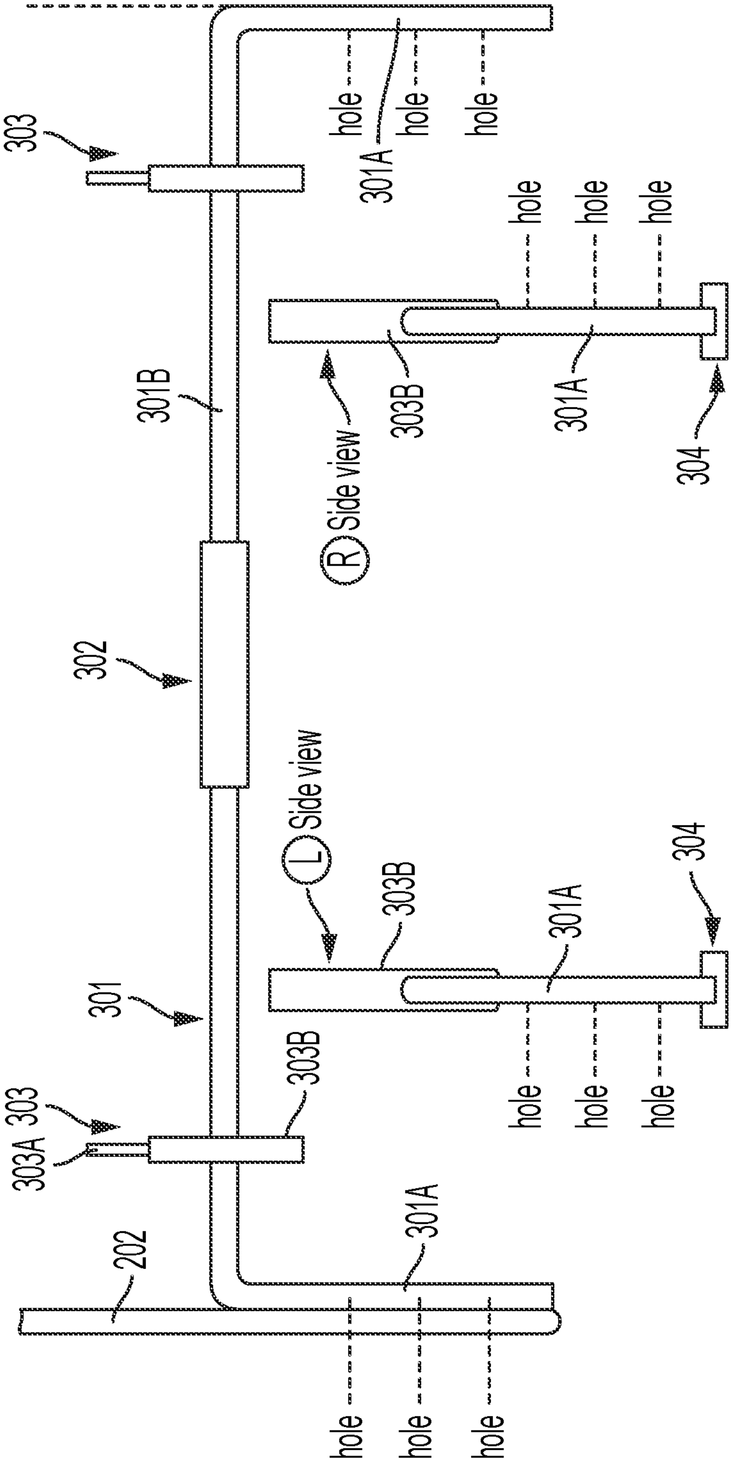
FIG. 3 illustrates an illustrative example of the wheelchair braking device.

FIG. 3 illustrates an example of the braking device 101. The rod 202 of the brake handle is connected to a connection component 301. As illustrated in FIG. 3, there are three holes located on the left side of the connection component 301 and three holes located on the right side of the connection component 301. These holes allow for connection of the brake handle rod 202 to the connection component 301. The holes being located on both sides of the connection component 301 allows the brake handle to be installed on either the left or right side of the wheelchair. This means that the braking device can be configured for a left- or right-handed user by allowing the braking handle to be located on either side of the wheelchair.

The number and location of holes for connecting the braking handle rod 202 to the connection component 301 may vary as compared to that shown in the figures. Connecting the braking handle rod 202 to the connection component 301 may be accomplished by utilizing any number of connecting mechanisms, for example, bolts, pins, press-fittings, rivets, and/or the like. Generally, the connecting mechanism will be removable and able to be reinstalled for ease of reconfiguring the location of the braking handle, but that is not strictly necessary. Additionally, in the case that the braking handle rod 202 is fixedly attached to the connection component 301, the holes may be removed altogether and other connecting means may be used, for example, welding, manufacturing the braking handle rod 202 and connection component 301 as a single piece, or any other fixed attachment means. Other attachment techniques are possible, for example, slide locks, mated pieces, and/or the like.

The connection component 301 extends between two brake mechanism 304, which are illustrated as being attached to the connection component 301 in the left- and right-side views. The connection component 301 may be non-linear because it extends between the brake mechanisms which are located near the wheels of the wheelchair, but must be attached to a portion of the wheelchair which may be located on a different plane from the brake mechanisms. Thus, as illustrated in FIG. 3 and FIG. 4, the connection component 301 is non-linear. However, this is not strictly necessary and different configurations are possible based upon the attachment of the braking device to the wheelchair and the location of the brake mechanisms with respect to the location of attachment.

The connection component 301 may be made of any type of suitable material, for example, steel, carbon fiber, plastic, aluminum, a combination of materials, and/or the like. Some materials may be more desirable than other due to strength and durability, but any type of material may be utilized. The connection component 301 illustrated in FIG. 3 includes a central member 301B and two arm members 301A. The two arm members are located on opposite ends of the central member 301B and extend perpendicularly to the central member 301B. It should be noted that the connection component 301 is illustrated as two manufactured pieces with the arm members 301A being bent portions from a piece of the the central member 301B. However, the connection component 301 could be created from multiple pieces of material. For example, the central member 301B could be two pieces material and each of the arm members 301A could be made from other pieces of material.

Additionally, different configurations of the connection component 301 are possible and contemplated. For example, the arm members 301A may not be perpendicular to the central member 301B, but may be bent or located having an angle other than 90 degrees from the central member 301B. The configuration of the connection component 301 may be based upon how the braking device is installed to a wheelchair and the type of wheelchair. For example, not all wheelchairs are the same width, although there are generally standard widths. Thus, to account for the different widths, the arm members 301A may be located at different angles with respect to the central member 301B.

Alternatively, to account for varying widths, the connection component 301 may include an adjustment mechanism 302. The adjustment mechanism 302 varies a length of the connection component 301. By adjusting the adjustment mechanism 302, the length of the connection component 301 can be varied, thereby allowing the connection component 301 to account for differences in widths of wheelchairs and the single configuration can be used on many different wheelchairs. The adjustment mechanism 302 may be any type of mechanism that can vary the length of the connection component 301. An example adjustment mechanism includes a turnbuckle where the end of the central member 301B that connects to the adjustment mechanism 302 is threaded and turning the turnbuckle causes the turnbuckle to traverse the threads, thereby lengthening or shortening the connection component 301. Other example adjustment mechanisms include pins and holes, detents, magnets, bolts and holes, and/or the like. Additionally, the location of the adjustment mechanism 302 may vary as compared to the figures.

The connection component 301 may also include a folding mechanism 401, illustrated in FIG. 4. The folding mechanism 401 allows the wheelchair braking device to collapse when the wheelchair braking device is installed on the wheelchair and the wheelchair is moved to a folded position. In other words, since wheelchairs are commonly foldable for ease of transport, the connection component 301 includes a folding mechanism 401 so that the braking device 101 can fold with the wheelchair. The folding mechanism 401 may be any type that allows for collapsing the connection component 301. An example folding mechanism 401 includes a spring that pulls back to allow the wheelchair to be folded. Other folding mechanisms are possible and contemplated, for example, multiple pieces that are held by a holder that can be released upon folding the wheelchair thereby separating the pieces, a hinged piece that can be locked in place when the connection component 301 is unfolded, and/or the like.

The connection component 301 also includes an attachment mechanism 303 that allows attachment of the braking device to the wheelchair. The attachment mechanism 303 includes an attachment head 303A that allows for attachment to the wheelchair and an attachment body 303B that attaches to the connection component 301. Different types of attachment mechanisms 303 can be utilized. However, since current wheelchairs may be retrofitted with the braking device 101, the attachment mechanism attachment head 303A may be one that allows for attachment to a bar or part that is already installed. Thus, example attachment heads 303A may include clamps (e.g., hinged clamps, bar clamps, pressure clamps, etc.), friction holders, pressure holders, bolts, and/or the like.

Figure 5A:
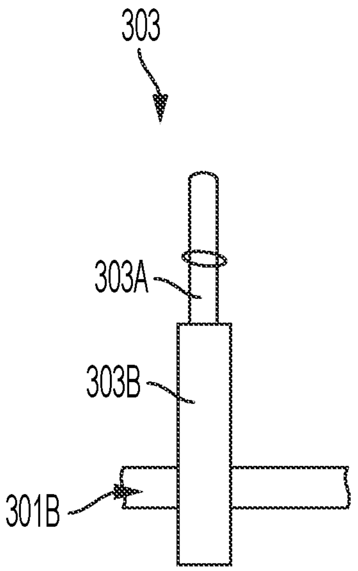
FIG. 5A illustrates an illustrative example of an attachment mechanism for the wheelchair braking device side view.
Figure 5B:
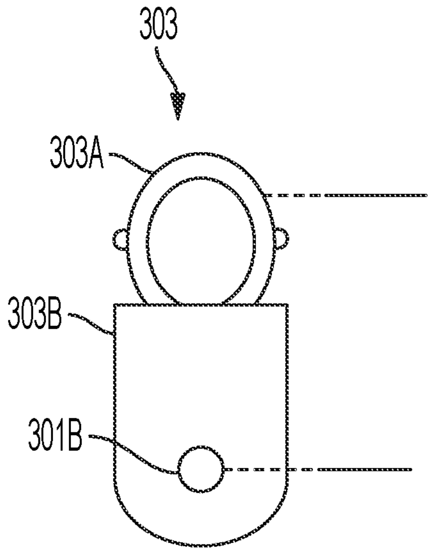
FIG. 5B illustrates an illustrative example of an attachment mechanism for the wheelchair braking device front view.

The attachment body 303B may be manufactured with the connection component 301, so it may be a piece that has a hole through it that allows for installing the connection component 301 through the attachment body 303B. However, similar attachment mechanisms as explained with respect to the attachment head 303A are also possible. Additionally, other types or configurations of attachment heads 303A and/or attachment bodies 303B are possible, for example, hooks, loops, snaps, buckles, sleeves, ties, and/or the like. The attachment mechanism may be of any suitable material, including, but not limited to, steel, aluminum, plastic, hook-and-loop, carbon fiber, and/or the like. Additionally, the location and configuration of the attachment mechanisms 303 may vary as compared to the figures. FIG. 5A and FIG. 5B illustrates an example attachment mechanism that includes a clamp for the attachment head 303A for installation at the wheelchair and an attachment body 303B that is attached to the central member 301B of the connection component 301.

The attachment mechanism may also include a plurality of detects that, when the braking device is engaged or disengaged, the connection component 301 engages with the detents. This prevents the person operating from having to push the braking handle into a fully engaged or fully disengaged position in a single movement. In other words, due to the fact that a person operating the braking device may have weakened pushing force, the braking device may be equipped with detents or indents that catch as the person is engaging the braking device to assist in holding the braking device as the person moves through the engagement or disengagement movement. In this case, the braking device may include a release mechanism that prevents the braking device from engaging the detents or indents. However, this is not strictly necessary as the detents or indents may simply be overcome by applying a small amount of force in one direction or the other.

As illustrated in the left- and right-side views of FIG. 3, the brake mechanisms 304 are located at a distal end, with respect to the central member 301B, of the arm members 301A. The brake mechanisms 304 can be any kind of braking material, for example, those used in traditional wheelchair braking systems. Examples of braking material for the brake mechanisms 304 include, but are not limited to, a brake pad, metal piece that digs into the wheels, plastic, and/or any type of material and/or shape to provide for holding of the wheelchair wheels when the braking device is engaged. Detail of a braking mechanism in the form of a brake pad is illustrated in of FIG. 4 which illustrates a front view and a top view.

When the handle of the braking device 101 is moved towards the brake engaged position, the brake mechanisms 304 move towards the wheels of the wheelchair and engage with the wheels to prevent the wheels from spinning. When the handle of the braking device 101 is moved towards the brake disengaged position, the brake mechanisms 304 move away from the wheels of the wheelchair and disengage with the wheels to allow the wheels to spin. The movement of the brake mechanisms 304 towards or away from the wheels is simultaneous, meaning both brake mechanisms 304 move at the same time either towards or away from the wheels depending on the direction the handle 101 is moved. Thus, the described braking device allows for engaging both braking mechanisms at the same time and the force required to engage or disengage the brakes is smaller than that required by traditional wheelchair braking systems.

Accordingly, the described braking device and system provides a safer wheelchair experience than traditional wheelchairs. The wheelchair brakes can be engaged with actuation of the of a single braking handle. This ensures that all the wheelchair brakes will be engaged at the same time, thereby preventing the wheelchair from moving. Additionally, since all the wheelchair brakes are engaged, a person does not need to worry about a single brake being partially engaged and resulting in the wheelchair moving in a circle as the person is attempting to sit down into the wheelchair or stand up from the wheelchair. Additionally, the described braking device requires less force to engage the brakes than traditional wheelchair braking devices, thereby making the device easier to use when engaging the brakes which assists in ensuring that the wheelchairs brakes are fully engaged. Additionally, because only a single handle needs to be actuated to engage the wheelchair brakes, a person utilizing the wheelchair who may have trouble remembering things only has to remember to actuate a single handle to engage the wheelchair brakes, instead of remembering to engage all the brakes individually. Thus, the described wheelchair braking device and system provides a safer wheelchair for all those who may need to use a wheelchair.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A wheelchair braking device, the wheelchair braking device comprising:

at least two brake mechanisms, wherein, when the wheelchair braking device is engaged in a brake position on a wheelchair, at least one brake mechanism engages with a first of a plurality of wheels on the wheelchair and at least a second brake mechanism engages with a second of the plurality of wheels on the wheelchair;

a substantially rigid connection component comprising a folding mechanism and an adjustment mechanism, the connection component extending directly between and mechanically connecting to each of the at least two brake mechanisms, whereby movement of the connection component directly controls movement of the at least two brake mechanisms simultaneously; and a brake handle formed at least partially from and connected to the connection component and causing movement of the connection component and the at least two brake mechanisms simultaneously with respect to the plurality of wheels.

2. The wheelchair braking device of claim 1, wherein the adjustment mechanism varies a length of the connection component.

3. The wheelchair braking device of claim 2, wherein the adjustment mechanism comprises a turnbuckle.

4. The wheelchair braking device of claim 1, wherein the folding mechanism that allows the wheelchair braking device to collapse when the wheelchair braking device is installed on the wheelchair and the wheelchair is moved to a folded position.

5. The wheelchair braking device of claim 1, further comprising at least one attachment mechanism that allows attachment of the wheelchair braking device to the wheelchair.

6. The wheelchair braking device of claim 1, wherein the connection component comprises a central member and two arm members located on opposite ends of the central member and extending generally perpendicular to the central member.

7. The wheelchair braking device of claim 6, wherein the at least one brake mechanism is located at a distal end, with respect to the central member, of one of the arm members and wherein the at least a second brake mechanism is located at a distal end, with respect to the central member, of another of the arm members.

8. The wheelchair braking device of claim 1, wherein a location of the brake handle on the connection component is configurable between a left side and a right side of the connection component.

9. The wheelchair braking device of claim 1, wherein the brake handle comprises a knob located at a distal end of the brake handle with respect to the connection component.

10. A wheelchair braking system, the braking system comprising:

a wheelchair comprising a plurality of wheels; and a wheelchair braking device coupled to the wheelchair, the wheelchair braking device comprising:

at least two brake mechanisms, wherein, when the wheelchair braking device is engaged in a brake position on the wheelchair, at least one brake mechanism engages with a first of the plurality of wheels on the wheelchair and at least a second brake mechanism engages with a second of the plurality of wheels on the wheelchair;

a substantially rigid connection component comprising a folding mechanism and an adjustment mechanism, the connection component extending directly between and mechanically connecting to each of the at least two brake mechanisms, whereby movement of the connection component directly controls movement of the at least two brake mechanisms simultaneously; and a brake handle formed at least partially from and connected to the connection component and causing movement of the connection component and the at least two brake mechanisms simultaneously with respect to the plurality of wheels.

11. The wheelchair braking system of claim 10, wherein a distal end, with respect to the connection component, of the brake handle is located at a position at the wheelchair proximate to an armrest of the wheelchair.

12. The wheelchair braking system of claim 10, wherein the adjustment mechanism varies a length of the connection component.

13. The wheelchair braking system of claim 12, wherein the adjustment mechanism comprises a turnbuckle.

14. The wheelchair braking system of claim 10, wherein the folding mechanism allows the braking system to collapse when the wheelchair braking device is installed on the wheelchair and the wheelchair is moved to a folded position.

15. The wheelchair braking system of claim 10, further comprising at least one attachment mechanism that allows attachment of the wheelchair braking device to the wheelchair.

16. The wheelchair braking system of claim 15, wherein the attachment mechanism comprises a plurality of detents and where, upon movement of the brake handle, the connection component engages with at least one of the plurality of detents.

17. The wheelchair braking system of claim 10, wherein the connection component comprises a central member and two arm members located on opposite ends of the central member and extending generally perpendicular to the central member.

18. The wheelchair braking system of claim 17, wherein the at least one brake mechanism is located at a distal end, with respect to the central member, of one of the arm members and wherein the at least a second brake mechanism is located at a distal end, with respect to the central member, of another of the arm members.

19. The wheelchair braking system of claim 10, wherein a location of the brake handle on the connection component is configurable between a left side and a right side of the connection component.

20. The wheelchair braking system of claim 10, wherein the brake handle comprises a knob located at a distal end of the brake handle with respect to the connection component.

* * * * *